United States Patent [19]
Kamoda et al.

[11] Patent Number: 5,361,109
[45] Date of Patent: Nov. 1, 1994

[54] DISPLAY ARRANGEMENT FOR CHARGING CONDITION IN STROBING CIRCUIT OF PHOTOGRAPHIC CAMERA WITH BUILT-IN STROBE-FLASH DEVICE

[75] Inventors: Takashi Kamoda; Haruo Onozuka, both of Ohmiya, Japan

[73] Assignee: Fuji Photo Optical Co., Ltd., Ohmiya, Japan

[21] Appl. No.: 89,883

[22] Filed: Jul. 12, 1993

[30] Foreign Application Priority Data

Jul. 13, 1992 [JP] Japan .................. 4-208505

[51] Int. Cl.⁵ .............. G03B 7/26; G03B 15/02; G03B 17/00
[52] U.S. Cl. .............. 354/145.1; 354/484; 354/127.11; 354/289.1
[58] Field of Search ........... 354/413, 484, 127.11, 354/127.12, 149.11, 418, 145.1, 289.1, 289.12

[56] References Cited

U.S. PATENT DOCUMENTS

| | | | |
|---|---|---|---|
| 4,106,037 | 8/1978 | Nakamura et al. | 354/127.11 |
| 4,130,356 | 12/1978 | Yamanaka | 354/145.1 |
| 4,153,355 | 5/1979 | Ikawa et al. | 354/145.1 |
| 4,260,231 | 4/1981 | Kawarada | 354/127.11 |
| 4,382,666 | 5/1983 | Ohtaki et al. | 354/127.11 |

OTHER PUBLICATIONS

U.S. Application Ser. No. 08/081,526, filed Jun. 23, 1993, entitled Source Voltage Monitor for a Photographic Camera.
U.S. Application Ser. No. 08/071,706, filed Jun. 4, 1993, entitled Film Transporting System for Photographic Camera.
U.S. Application Ser. No. 08/071,703, filed Jun. 4, 1993, entitled Input System for Photographic Camera.
U.S. Application Ser. No. 08/073,171, filed Jun. 8, 1993, entitled Film Transporting System for Photographic Camera.

Primary Examiner—Michael L. Gellner
Assistant Examiner—Jae N. Noh
Attorney, Agent, or Firm—Price, Heneveld, Cooper, DeWitt & Litton

[57] ABSTRACT

A display arrangement for the charging condition in a strobing circuit of a photographic camera with a built-in strobe-flash device includes a display lamp, serving to indicate that charging in the strobing circuit has been completed, and a controller for a main switch of the camera. The display lamp is covered by the controller as the controller is moved to turn the main switch OFF, and uncovered again as the controller is moved to turn the main switch ON, in order to bring the camera in a state ready for photographing. Thus, the display lamp is invisible even though the display lamp is on when the main switch is in the OFF state. In this manner, the strobing circuit can be arranged so as to be always charged, and thereby to make charging in the strobing circuit independent from the ON-OFF state of the main switch.

5 Claims, 4 Drawing Sheets

DISPLAY ARRANGEMENT FOR CHARGING CONDITION IN STROBING CIRCUIT OF PHOTOGRAPHIC CAMERA WITH BUILT-IN STROBE-FLASH DEVICE

BACKGROUND OF THE INVENTION

1. Technical Field

This invention relates to a display arrangement for the charging condition in a strobing circuit of a photographic camera with a built-in strobe-flash device used to indicate that charging in the strobing circuit has been completed.

2. Prior Art

Recently the photographic camera with a built-in strobe-flash device has been popularized. The built-in strobe-flash device is usually adapted to be automatically discharged for an object to be photographed having a luminance lower than a predetermined level. However, should a main capacitor for the strobe-flash device have been insufficiently charged at a moment of such photographing, it would be impossible for the store-flash device to emit a predetermined intensity of light, and this might result in underexposure.

To avoid such inconvenience, most of the conventional cameras with built-in strobe-flash devices have been provided with display means serving to indicate whether the main capacitor in the strobing circuit has been sufficiently charged. Such displays of prior art cameras are usually provided in the form of a display lamp comprising a neon tube, or the like, included in the strobing circuit, which is partially visible through the outer wall of the camera, for example, adjacent the view-finder window or on the top of the camera, and the display lamp is turned on upon completion of charging.

With the conventional camera of the type mentioned above, it has been required to turn off the display lamp during nonuse of the camera regardless of whether the strobing circuit is in a sufficiently charged state or not, since the display lamp remaining turned on during nonuse of the camera is confusing for a user. To meet such a requirement, the circuit serving to turn the display lamp on has conventionally comprised, as shown by FIG. 5 of the accompanying drawings, a neon tube 2 electrically connected in parallel to a main capacitor 1 of the strobing circuit, and an NPN transistor 3 having its collector electrically connected to the neon tube 2, its emitter grounded, and its base electrically connected through a resistor 7 between a main switch 5 electrically connected to a power source 4, on one hand, and a release switch electrically connected in series with the main switch 5, on the other hand. A junction between the main switch 5 and the release switch 6 is electrically connected through the resistor 7 and a resistor 8 to the emitter of transistor 3. It should be understood that the main capacitor 1 for the strobe-flash device is always charged.

The transistor 3 is turned ON as the main switch 5 is closed to its ON position and the neon tube 2 is turned on when the main capacitor 1 has been charged to a sufficient voltage level. Opening the main switch 5 to its OFF position causes the transistor 3 to be turned OFF and consequently the neon tube 2 is turned off.

However, it will be apparent from FIG. 5 that it has been required for the conventional display arrangement described above to turn on or off the neon tube 2 in response to the state of the main capacitor 5. To achieve this, the strobing circuit has had to include additional circuit elements such as the transistor 3 serving to switch the neon tube 2 and is thus correspondingly complicated.

SUMMARY OF THE INVENTION

Accordingly, it is a principal object of the invention to provide a display arrangement for the charging condition in the strobing circuit of a photographic camera with a built-in strobe-flash device so improved that the number of parts necessary to form the strobing circuit may be decreased, leakage current from the main capacitor of the strobing circuit possibly occurring during nonuse of the camera may be substantially eliminated, and charged and non-charged states may be reliably recognized.

To achieve the object set forth above, the invention generally resides in a display arrangement for a charging condition in a strobing circuit of a photographic camera with a built-in strobe-flash device characterized by control means movably provided on an outer side of the camera to control a main switch so as to switch the camera between a state being ready for photographing and a state being unready for photographing. A display lamp for the charging condition in the strobing circuit is provided within a movement range of the control means so that the display lamp is partially visible through the outer wall of the camera. The display lamp is located within the movement range so as to be covered by a part of the control means when the control means has been moved to a position at which the camera becomes unready for photographing and to be uncovered again when the control means has been moved to a position at which the camera becomes ready for photographing.

Preferably, the strobing circuit is provided independently of the circuit including the main switch of the camera so that charging of the main capacitor in the strobing circuit may be initiated regardless of the ON-OFF state of the main switch or an alternative arrangement is provided such that charging in the strobing circuit may be initiated and stopped by turning the main switch ON and OFF, respectively.

When the control memos is provided slidably along the outer wall of the camera, the display lamp is mounted so as to be partially overlapped by a portion of the outer wall within the movement range of the control. means and the portion of the outer wall is defined by a transparent plate, or the like, so that the display lamp may be visually recognized.

The display lamp is uncovered so as to indicate that charging has been completed in the strobing circuit as the control means is slidably moved to a position at which the main switch is turned ON and thereby the camera becomes ready for photographing. Once the main switch has been turned OFF, the display lamp is covered by a part of the control means and no light emitted from the display lamp can be visually recognized even if the main capacitor for the strobe-flash device is in a sufficiently charged state and the display lamp is really turned on. Obviously, the display lamp is not turned on until the main capacitor for the strobe-flash device is charged to the desired level.

BRIEF DESCRIPTION OF THE DRAWINGS

FIG. 4 is a diagram schematically showing an electric circuit serving to turn a display lamp of the display arrangement on.

DETAILED DESCRIPTION OF THE PREFERRED EMBODIMENTS

The display arrangement for the charging condition in the strobing circuit of a photographic camera with the built-in strobe-flash device according to the invention will be described in more detail with reference to the accompanying drawings.

Figure 1:
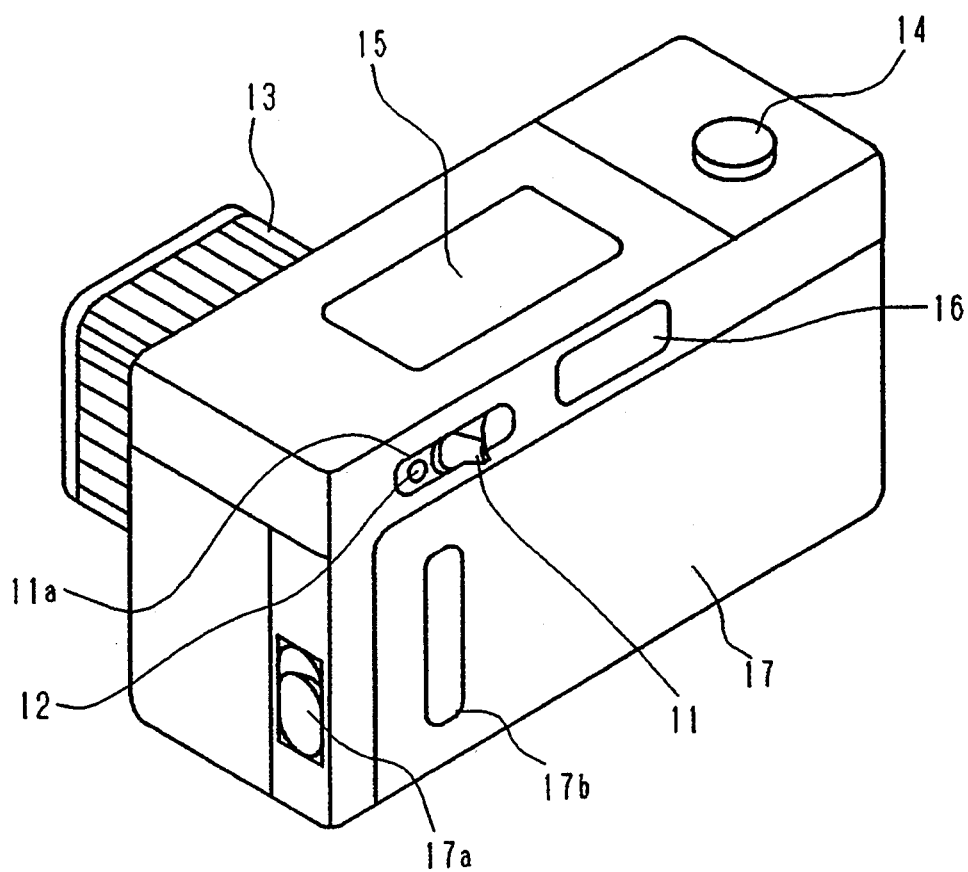
FIG. 1 is a perspective view showing the photographic camera with the built-in strobe-flash device provided with a display arrangement for the charging condition in the strobing circuit, as viewed from the rear side.

FIG. 1 is a perspective view of a photographic camera provided with a display arrangement for the charging condition in a strobing circuit. The camera is provided on its front side with a strobe-flash window (invisible in FIG. 1) and on its rear side adjacent the upper edge with a main switch knob 11 adapted to be slidably moved in a horizontal direction within a horizontally elongate elliptical guide recess 11a formed in the rear wall of the camera. Movement of this main switch knob 11 causes a main switch 24, which will be described later, to be turned ON or OFF. In FIG. 1, the main switch knob 11 is shown as having been moved to a position at which the main switch has been turned ON and thereby the camera has been made ready for photographing. There is provided a lamp display window 12 within a movement range of the main switch knob 11, i.e., within the guide recess 11a, at a location at which a user's finger is released from the main switch knob 11 immediately after the main switch has been turned ON. This location corresponds to a location lying immediately behind the main switch knob 11 which has turned the main switch OFF. The lamp display window 12 comprises a transparent plate, a translucent plate, or the like, and the bottom of the guide recess 11a is partially formed by this lamp display window 12.

Referring also to FIG. 1, the camera is provided on its front side with a lens barrel 13 holding therein an objective (not shown) and adapted to be movable along an optical axis. Movement of the lens barrel 13 causes a focal distance of the objective to be varied. The camera is provided on its top with a release button 14. Depression of this release button 14 causes a release switch, which will be described later, to be turned ON and thereby the shutter is released. The camera is further provided on its top with a state display 15 comprising, for example, a liquid crystal display device, on which various kinds of information, such as the number of consumed film frames and a photographing mode, for example, "SELF-TIMER" mode, are displayed.

The camera is provided on its rear side at the middle adjacent the upper edge with a view-finder window 16. The rear side of the camera is partially defined by a rear cover 17 adapted to be opened by operating a lever 17a provided on one lateral side of the camera when it is desired to load or unload a film roll into or from the camera. The rear cover 17 is provided, in turn, at an appropriate location with a film assurance window 17b comprising, for example, a transparent plate through which the existence of the film roll can be visually checked.

Figure 4:
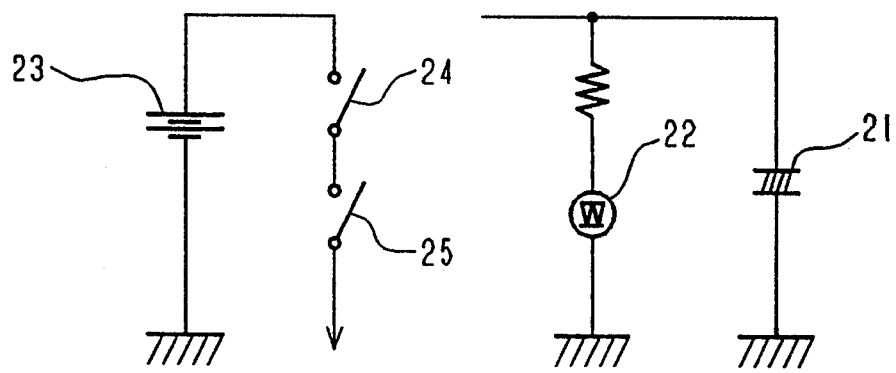
Figure 5:
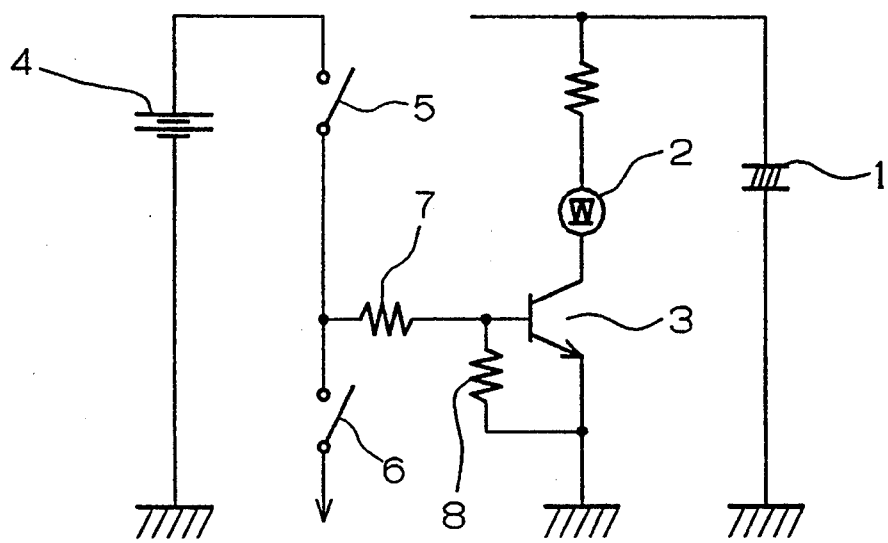
FIG. 5 is a diagram similar to FIG. 4 but showing an electric circuit of the prior art.

FIG. 4 schematically shows a circuit suitable for lighting a display lamp for the charging condition in the strobing circuit. As shown, the display lamp 22 is electrically connected in parallel to a main capacitor 21 of the strobing circuit so that the display lamp 22 is turned on a light when the main capacitor 21 is sufficiently charged, indicating completion of charging. A main switch 24 and a release switch 25 are electrically connected to a power source 23 wherein, as previously mentioned, the main switch 24 is turned ON or OFF as the main switch knob 11 is slidably moved, depending on the direction in which the knob 11 is moved and the release switch 25 is turned ON by depression of the release button 14. The circuit for lighting the display lamp 22 is provided independently of the circuit including the main switch 24 and the release switch 25. The main capacitor 21 is adapted to be always charged and therefore the display lamp 22 is turned on independently of whether the main switch 24 is operated or not, so far as the main capacitor 21 is at an adequately charged state.

An alternative arrangement is also possible, wherein charging of the main capacitor 21 is initiated by turning a strobe-flash device charging switch (not shown) ON. In this case, the strobe-flash device charging switch thus turned ON indicates that the main capacitor is being charged regardless of the main switch state.

The display lamp 22 is provided so as to be partially aligned with the lamp display window 12.

Now, the manner in which the display arrangement for the charging condition in the strobing circuit described above operates will be described.

Figure 2:
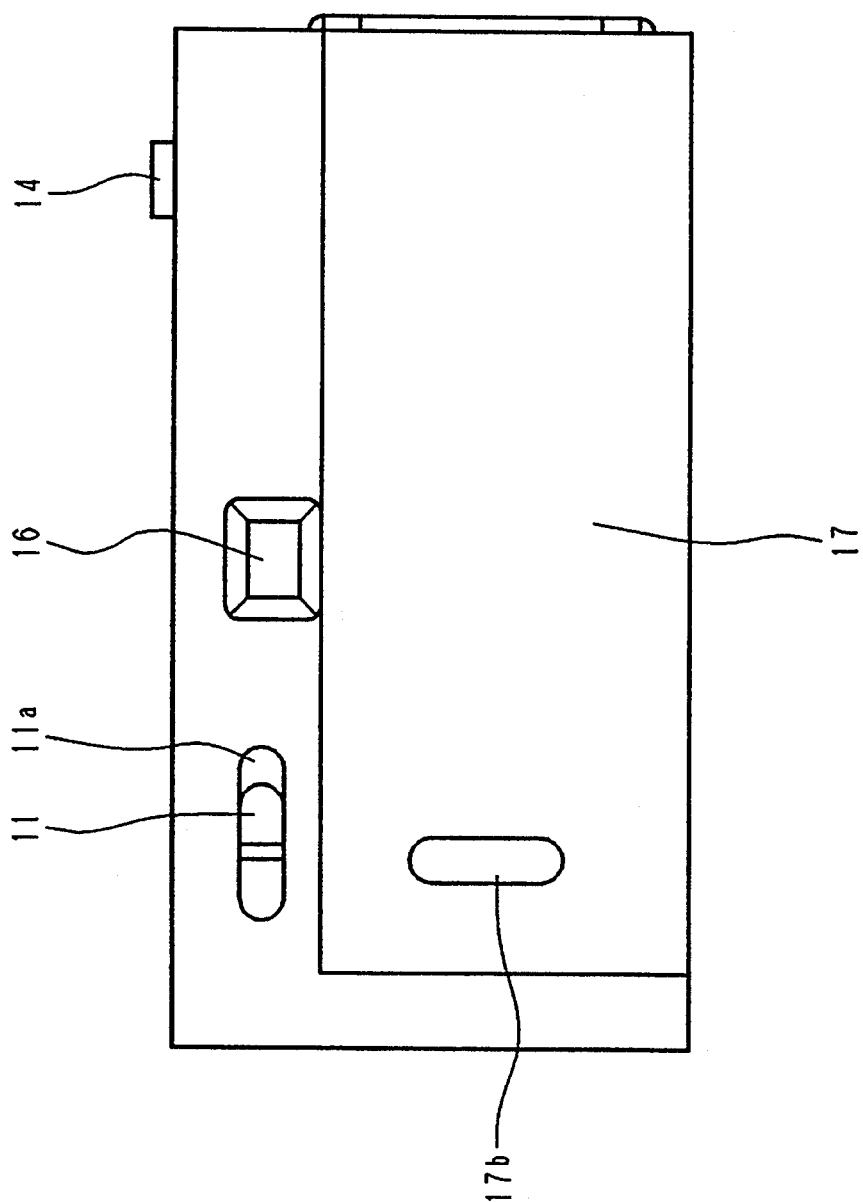
FIG. 2 is a rear view showing the camera of FIG. 1 in a state unready for photographing.

FIG. 2 is a rear view showing the camera as being in a state unready for photographing. In tills state, the main switch knob 11 has moved within the guide recess 11a to the left side, as viewed in this figure. Consequently, the lamp display window 12 is positioned behind the main switch knob 11 and covered by this knob 11. Accordingly, no light emitted from the display lamp 22 located in alignment with the lamp display window 12 can be visually recognized by a user even if the display lamp 22 is turned ON. In such a state, the camera is in the state unready for photographing, since the main switch knob 11 has been moved to the left side within the guide recess and thereby the main switch 24 has been turned OFF.

To bring the camera into the state ready for photographing, the main switch knob 11 may be slidably moved from the left side to the right side within the guide recess 11a and thereby the main switch 24 may be turned ON.

Figure 3:
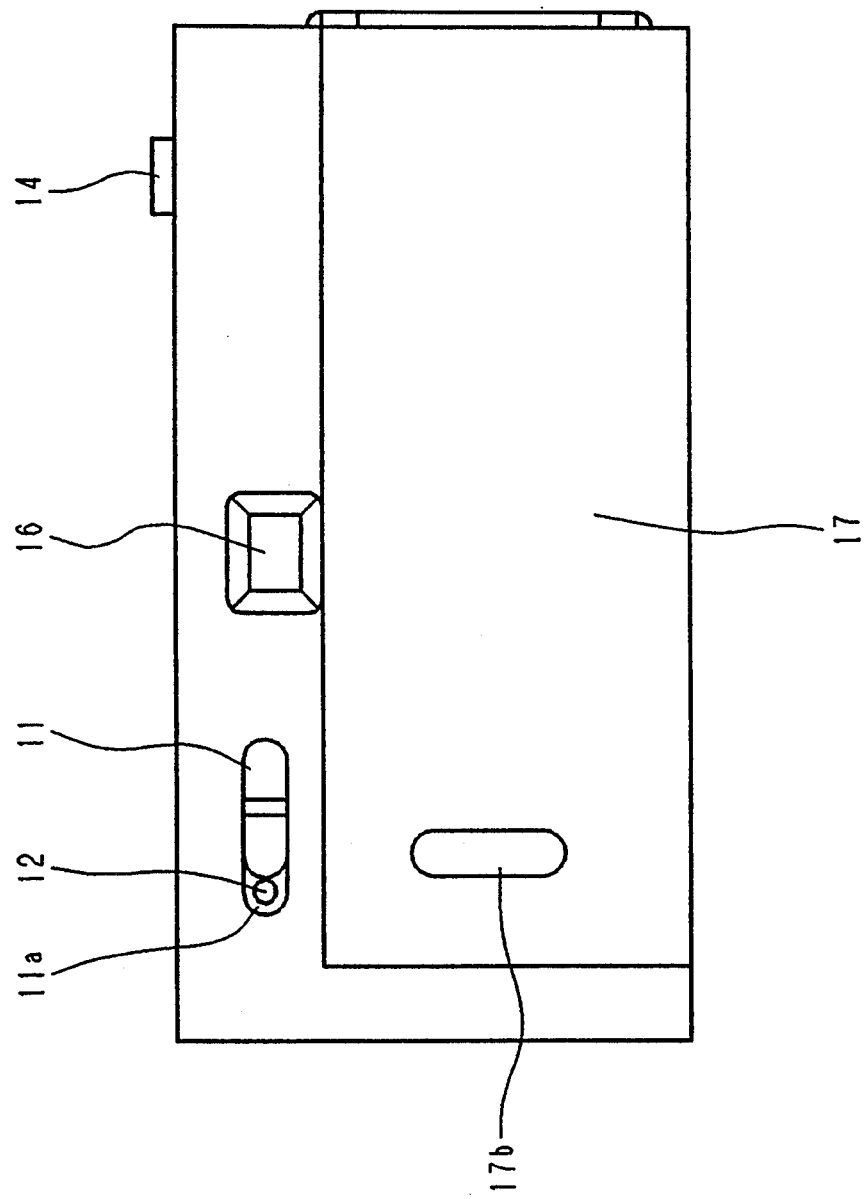
FIG. 3 is a view similar to FIG. 2 but showing the camera in a state ready for photographing.

The lamp display window 12, which has been covered by the main switch knob 11, is uncovered, as shown by FIG. 3, as the main switch knob 11 is slidably moved toward the right side. If the main capacitor 21 in the strobing circuit has been sufficiently charged until this moment, the display lamp 22 is turned on and light emitted therefrom can be visually recognized by a user through the lamp display window 12.

Depression of the release button 14 causes the release switch 25 to be turned ON and the shutter is released through a series of predetermined operations of the camera. If the photographing takes place in STROBE-mode, the strobe-flash device is discharged synchronously with the release. Once the strobe-flash device has been discharged, charging of the main capacitor 21 is initiated immediately, and the display lamp 22 is turned on again when the main capacitor 21 is charged to the predetermined level. In this manner, the display lamp 22 thus turned on again, is visually recognized, indicating that the camera is ready for the next photographing in STROBE-mode.

When the main switch knob 11 is slidably moved to the left side to bring the camera into the state unready for photographing (FIG. 2), the lamp display window 12 is covered by the main switch knob 11, as previously mentioned, so that the display lamp 22 is not externally visible.

While the instant embodiment has been illustrated and described as having the main switch knob 11 provided in a slidably movable manner, it is also possible within the scope of the invention to provide the main switch knob 11 adapted to be rotatably moved in order to operate the main switch 24. In this case, a location may be defined on the camera wall, that disappears and appears as the rotatable main switch knob 11 is rotated, and the lamp display window 12 may be provided at this location.

While the instant embodiment has been illustrated and described as having the electric circuit serving to light the display lamp 22 functioning independently of the electric circuit comprising the main switch 24 and the release switch 25, the invention is not limited to such an arrangement. Even if these electric circuits are arranged to be operatively associated with each other, it is possible to meet the requirement that the display lamp 22 should be covered by the main switch knob 11 during nonuse of the camera. However, the specific embodiment of these electric circuits, as has been illustrated and described above, is the preferred embodiment since the main capacitor 21 in the strobing circuit is continuously charged independently of the other circuit, and therefore photographing in STROBE-mode can be initiated at once merely by turning the main switch 24 ON without waiting for completion of charging in the strobing circuit.

EFFECT OF THE INVENTION

As will be apparent from the foregoing description, the invention resides in a display arrangement for a charging condition in a strobing circuit of a photographic camera with a built-in strobe-flash device including control means adapted to be moved along the outer surface of the camera to operate a main switch and a display lamp provided at a location behind the control means to indicate a charging condition in the strobing circuit. The display lamp may be completely covered by the control means and uncovered again so as to be partially visible as the control means is moved. More specifically, a user can reliably check the charging condition in the strobing circuit by an arrangement wherein the display lamp is uncovered when the main switch is turned ON by the control means, and thereby the camera is brought into the state ready for photographing. When the main switch is turned OFF by the control means, the display lamp is covered by the control means and the display is not externally visible even though the display lamp remains on. In this way, it is unnecessary to turn the display lamp for the charging condition of the strobing circuit operatively on or off in association with turning the main switch of the camera ON or OFF, respectively.

More specifically, the number of parts can be decreased since it is not required to provide an additional circuit serving to turn on or off the display lamp in operative association with turning ON of OFF the main switch.

Furthermore, the display arrangement of the invention allows the cost to be reduced since the arrangement merely utilizes movement of the control means, which is an existing pail, and thus requires no additional parts.

Although the invention has been described with respect to specific preferred embodiments thereof, many variations and modifications will become apparent to those skilled in the art. It is, therefore, the intention that the appended claims be interpreted as broadly as possible in view of the prior art to include all such variations and modification.

The embodiments of the invention in which an exclusive property or privilege is claimed are defined as follows:

1. A display arrangement for charging condition in a strobing circuit of a photographic camera with a built-in strobe-flash device characterized by:

control means movably provided on an outer wall of the camera for controlling a main switch to switch the camera between a state ready for photographing and a state unready for photographing, said control means for the main switch being slidably movable along the camera wall; and a display lamp for the charging condition in the strobing circuit, said display lamp being provided within a movement range of the control means so that said display lamp is visible through the outer wall of the camera, said display lamp being located within the movement range such that it is covered by a part of said control means when said control means has been moved to a position at which the camera is unready for photographing and uncovered when said control means has been moved to a position at which the camera is ready for photographing, said display lamp being covered or uncovered by said control means as said control means is slidably moved.

2. A display arrangement for the charging condition in a strobing circuit of a photographic camera with a built-in strobe-flash device, comprising:

a selector movably provided on an outer wall of the camera to control a main switch to switch the camera between a state ready for photographing and a state unready for photographing, said selector being slidably movable along the camera wall;

a display lamp for the charging condition in the strobing circuit, said display lamp being provided within a movement range of said selector so said display lamp is partially visible through the outer wall of the camera, said display lamp being located within the movement range such that it is covered by a part of said selector when said selector is moved to a position at which the camera is unready for photographing and uncovered when said selector is moved to a position at which the camera is ready for photographing, said display lamp being covered or uncovered by said control means as said control means is slidably moved; and a strobing circuit provided independently of the electric circuit including the main switch, so charging in the strobing circuit may be initiated independently of the ON-OFF state of the main switch.

3. A display arrangement for the charging condition in a strobing circuit of a photographic camera with a built-in strobe-flash device, comprising:

a selector movably provided on an outer wall of the camera to control a main switch to switch the camera between a state ready for photographing and a state unready for photographing, said selector being slidably movable along the camera wall;

a display lamp for the charging condition in the strobing circuit, said display lamp being provided within a movement range of said selector so said display lamp is partially visible through the outer wall of the camera, said display lamp being located within the movement range such that it is covered by a part of said selector when said selector is moved to a position at which the camera is unready for photographing and uncovered when said selector is moved to a position at which the camera is ready for photographing, said display lamp being covered or uncovered by said selector as said selector is slidably moved; and a strobing circuit provided independently of the electric circuit including the main switch, so that charging in the strobing circuit may be initiated independently of the ON-OFF state of the main switch, said strobing circuit including a charging initiator switch so charging of the strobing circuit may be initiated by turning said initiator switch ON.

4. A display arrangement for the charging condition in a strobing circuit of a photographic camera with a built-in strobe-flash device, comprising:

a selector movably provided on an outer wall of the camera to control a main switch to switch the camera between a state ready for photographing and a state unready for photographing, said selector being slidably movable along the camera wall;

a display lamp for the charging condition in the strobing circuit, said display lamp being provided within a movement range of said selector so said display lamp is partially visible through the outer wall of the camera, said display lamp being located within the movement range such that it is covered by a part of said selector when said selector is moved to a position at which the camera is unready for photographing and uncovered when said selector is moved to a position at which the camera is ready for photographing; said display lamp being covered or uncovered by said selector as said selector is slidably moved; and a strobing circuit provided independently of the electric circuit including the main switch, so charging in the strobing circuit may be initiated independently of the ON-OFF state of the main switch, said strobing circuit being always electrically connected to a power source so as to be continuously charged.

5. A display arrangement for the charging condition in a strobing circuit of a photographic camera with a built-in strobe-flash device, comprising:

control means movably provided on an outer wall of the camera for controlling a main switch to switch the camera between a state ready for photographing and a state unready for photographing, said control means for the main switch being slidably movable along the camera wall;

a display lamp for the charging condition in the strobing circuit, said display lamp being provided within a movement range of said control means so said display lamp is selectively visible through the outer wall of the camera, said display lamp being located within the movement range such that it is covered by a portion of said control means when said control means is moved to a position at which the camera is unready for photographing and uncovered again when said control means is moved to a position at which the camera is ready for photographing, said display lamp being covered or uncovered by said control means as said control means is slidably moved; and a charging circuit for the strobing circuit coupled to the main switch such that charging in the strobing circuit is initiated and stopped by turning the main switch ON and OFF, respectively.

* * * * *

UNITED STATES PATENT AND TRADEMARK OFFICE
CERTIFICATE OF CORRECTION

PATENT NO. : 5,361,109
DATED : November 1, 1994
INVENTOR(S) : Takashi Kamoda et al It is certified that error appears in the above-indentified patent and that said Letters Patent is hereby corrected as shown below:

Column 2, line 43:
"memos" should be --means--.

Column 2, line 47:
After "control" delete ".".

Column 4, line 36:
"In tills" should be --In this--.

Column 6, line 7:
"pail" should be --part--.

Signed and Sealed this

Eleventh Day of July, 1995

Attest:

BRUCE LEHMAN

Attesting Officer

Commissioner of Patents and Trademarks